US008966994B2

(12) United States Patent
Gentile et al.

(10) Patent No.: US 8,966,994 B2
(45) Date of Patent: Mar. 3, 2015

(54) METHOD FOR MONITORING A BODY INSERTED IN A CONDUIT AND INSERT FOR ELECTROMAGNETIC RESONANCE MEASUREMENTS

(75) Inventors: Roberto Gentile, Stavanger (NO); Rune Sørhus, Hafrsfjord (NO); Ebbe Gustaf Nyfors, Sandnes (NO)

(73) Assignee: Roxar Flow Measurement AS, Stavanger (NO)

( * ) Notice: Subject to any disclaimer, the term of this patent is extended or adjusted under 35 U.S.C. 154(b) by 538 days.

(21) Appl. No.: 13/257,126

(22) PCT Filed: Apr. 6, 2010

(86) PCT No.: PCT/EP2010/054521
§ 371 (c)(1),
(2), (4) Date: Sep. 16, 2011

(87) PCT Pub. No.: WO2010/115883
PCT Pub. Date: Oct. 14, 2010

(65) Prior Publication Data
US 2012/0006430 A1    Jan. 12, 2012

(30) Foreign Application Priority Data
Apr. 6, 2009   (NO) .................................... 20091392

(51) Int. Cl.
G01F 1/44    (2006.01)
G01F 1/40    (2006.01)
G01F 1/56    (2006.01)
G01F 1/74    (2006.01)

(52) U.S. Cl.
CPC .. G01F 1/40 (2013.01); G01F 1/56 (2013.01); G01F 1/74 (2013.01)
USPC ................... 73/861.63; 73/861.53; 73/861.08

(58) Field of Classification Search
None
See application file for complete search history.

(56) References Cited

U.S. PATENT DOCUMENTS 5,814,738 A    9/1998   Pinkerton et al.
6,915,707 B2   7/2005   Nyfors et al.
(Continued)

FOREIGN PATENT DOCUMENTS

| CN | 2735311 Y | 10/2005 |
| WO | WO-2007/089156 A1 | 8/2007 |
| WO | WO-2008025934 A1 | 3/2008 |
| WO | WO-2008025935 A1 | 3/2008 |

OTHER PUBLICATIONS

Politsch, Erich, "International Search Report", for PCT/EP2010/054521, as mailed Sep. 17, 2010, 6 pages.
(Continued)

Primary Examiner — Harshad R Patel
(74) Attorney, Agent, or Firm — Winstead PC

(57) ABSTRACT

Method for monitoring a body inserted in pipe conducting a fluid flow, the body being positioned in a distance from the pipe wall providing a gap between the body and the pipe wall, the gap constituting an electromagnetic, e.g. microwave, resonator, at least one coupling probe being positioned close to said gap, the method comprising the steps of applying an electromagnetic signal, monitoring the frequency response of the resonator through the probe, and analyzing the frequency response to provide a measure of movements, e.g. vibrations induced by a turbulent flow, of the body. The invention also relates to an insert with support structure especially shaped to avoid influence on the resonance measurement.

13 Claims, 5 Drawing Sheets

(56) References Cited

U.S. PATENT DOCUMENTS

2008/0148867 A1* 6/2008 Nyfors ........................ 73/861.63
2009/0000393 A1* 1/2009 Nyfors et al. .............. 73/861.19

OTHER PUBLICATIONS

Nyfors, E., et al., "Measuring the salt content of the water, the composition, and flow, of a wet gas stream using microwaves, differential pressure, and PVT calculations", Instrumentation and Measurement Technology Conference, 2004. IMTC 04. Proceedings of the 21st IEEE Como, Italy May 18-20, 2004, Piscataway, NJ, USA, IEEE, LNKD-DOI: 10.1109/IMTC.2004, 1351550, May 18, 2004, pp. 2288-2291, vol. 3.

Steven, Richard, "Horizontally installed cone differential pressure meter wet gas flow performance", Flow Measurement and Instrumentation, Butterworth-Heinemann, Oxford, GB, vol. 20, No. 4-5, Aug. 1, 2009, pp. 152-167.

* cited by examiner

Fig 1: PRIOR ART

METHOD FOR MONITORING A BODY INSERTED IN A CONDUIT AND INSERT FOR ELECTROMAGNETIC RESONANCE MEASUREMENTS

This invention relates to a method and unit related to inserts positioned in a fluid flow, especially related to flow meters where the insert provides a limitation in the flow for providing differential pressure or mechanical mixing of the fluids in multi-phase flow meters.

When a fluid is transported in a conduit, e.g., a pipe, there is often a need for a mixer, homogenizer, or flow conditioner to assure a well mixed, homogeneous flow. This is particularly true in the case of mixtures of oil, water, and gas. There is often also a need to measure the total volume flow, or the flow of the individual components, i.e. the composition and the flow speed. Several solutions have been developed for these tasks, which involve mounting some kind of an insert or body in the pipe. The insert or body is kept in place in the pipe by some kind of supports. The insert creates turbulence in the flow, which tends to mix or homogenize the flow. An insert is also a restriction to the flow, which causes the flow to accelerate, due to the reduced cross sectional area, as it passes the insert. The acceleration causes the pressure to drop, and thus creates a differential pressure over the insert. This differential pressure is proportional to the flow speed and density, thus providing a means to measure the flow. U.S. Pat. No. 5,814,738 shows an example of a bi-conical body, which was originally developed as a pure mixer, but has also been used as a differential pressure creating device for flow measurement. U.S. Pat. No. 6,915,707 also shows a bi-conical body, but with a different type of supports. This one is also used as a microwave resonator sensor to measure the permittivity of the flow, thus providing a means to measure the composition of the flow in addition to the flow speed.

When the flow passes the insert in a pipe, the insert creates turbulence. The turbulence in turn exposes the insert to mechanical forces. The mechanical structure, consisting of the insert and the supports, has mechanical resonances. If the turbulence contains frequencies in the range of a mechanical resonance, the turbulence will excite the resonance and cause cyclic mechanical vibrations. These vibrations cause cyclic stress loads in the material. If the flow speed is high, these forces may be high enough to induce fatigue cracks over time, even though the stress levels are below the yield strength of the material. Eventually this might lead to mechanical failure. The development of fatigue related failures depend on the total number of accumulated cycles over time, as well as the amplitude of the vibrations. Vibrations may also be imposed from the outside to the insert through mechanical vibrations in the pipe. These may also lead to the same kind of fatigue problems.

Abovementioned U.S. Pat. No. 6,915,707 describes inserts in the flow combined with a microwave probe providing a resonator, where the resonating field provides a measure of the permittivity of the flowing fluid passing the insert. The insert in U.S. Pat. No. 6,915,707 may be a cylindrical body mounted with the support, but the preferred embodiment is related to a cone shaped insert known as V-cone™. To generate a differential pressure a cone shaped insert is attached to the meter body through three welded support fins. The cone also acts as part of a microwave resonator as described above.

Of particular concern in this context is how the mechanical structure distributes the stress, if it is evenly distributed, or if there are, e.g., corners with extra high stress levels. Another concern is the material properties. Materials like various types of steel have well predictable properties. But when the steel is welded, the properties change and become less well predictable. Simulations on a known insert (See FIGS. 1 and 2 of this application below) show that there are extra high stress levels in the corner between the support and its transition to the cone. This means that the peak stress will be in the welded material, which is highly unfavourable.

One way to attempt to reduce the susceptibility to fatigue is to have only one support fin, which is known per se, which extends over the whole length of the insert. Although, this would reduce the stress described above, it would on the other hand make the structure more susceptible to forces perpendicular to the support fin. In addition this would affect the measurement properties as the field of the resonance mode would no longer be circularly symmetrical.

A design is always a compromise between features. Up to now it has been considered necessary to limit the supports to the cylindrical part of the insert. This has kept the microwave resonant frequency sufficiently low and thereby much easier to measure without the influence from reflections and standing waves in cables. It has, however, been found that with present day electronics the detrimental effects of the supports to the measurement are not so important.

On the other hand, increasing the length of the cylindrical part and the supporting fins further, or increasing the thickness of the fins, would bring no benefit to the fatigue problem as the stress at the base of the cone would be essentially unchanged. Increasing the length of the fins to extend some distance up on the slope of the cone would make the structure mechanically stronger, but there would still be a concentration of stress at the joining point. The structure would also increase the microwave resonant frequency quite substantially.

The object of this invention is thus to reduce the risk level for vibration induced fatigue failures in insert structures without reducing the quality of microwave resonant frequency measurements. In a first aspect this is achieved by an improved mechanical design, and in a second aspect this is achieved by a means of detecting and monitoring the vibrations with the aim of being able to avoid hazardous mechanical vibrations. This object is obtained using a method and unit as characterized in the accompanying claims.

The invention thus provides several advantages over the prior art as the life span of the insert may be increased without making significant changes in the measuring system already installed in many flow meters. As no new probes have to be installed through the pipe wall the invention does not reduce the strength of the flow meter in high pressure applications, nor does it change the flow conditions or introduce any electrical currents other than the microwave signals to the pipe.

The invention will be described below with reference to the accompanying drawings, illustrating the invention by way of examples.

Figure 1:
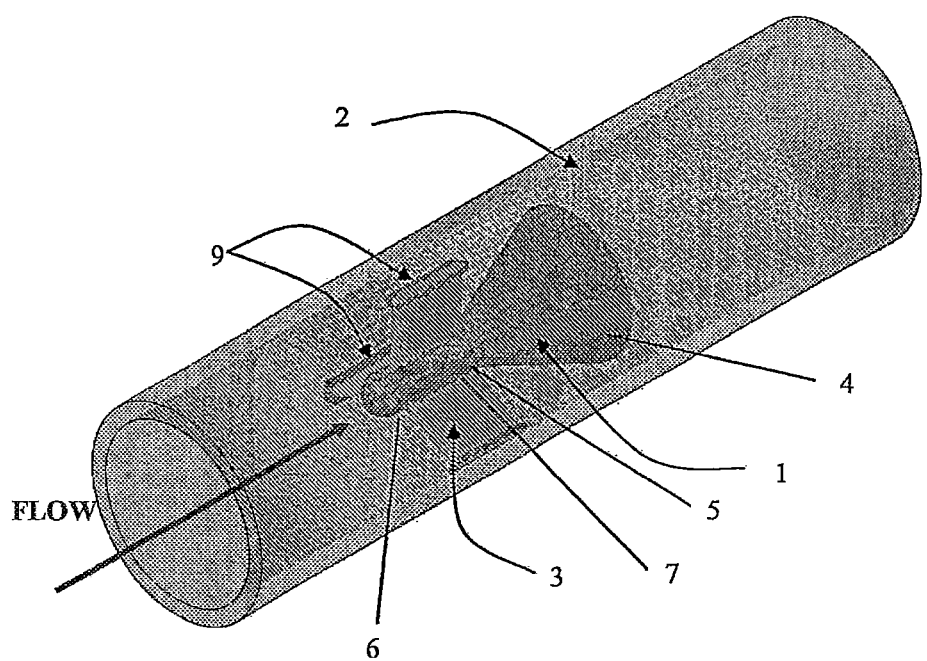
FIG. 1 illustrates a conical insert according to the known art.

FIG. 1 shows a prior art layout of a bi-conical insert 1 (hereinafter called cone), which is of a type generally described in U.S. Pat. No. 6,915,707, attached to a meter body 2 through three fins 3 at the upstream part of the cone 1. The fins are welded to the pipe wall and a cylindrical extension 7 of the cone.

The structure acts like a coaxial electromagnetic resonator structure. The supports short the upstream end to the pipe wall, while the other end is open. Therefore the resonance mode will have an electric field maximum in the open end, i.e. in the gap between the cone and the pipe wall. The permittivity of the fluid will affect the field, and thereby the resonance, as it passes in the gap. The resonant frequency depends among other things also on the distance between the open and shorted ends. The shorter the distance, the higher the resonant frequency will be. In order not to radiate the energy out into the pipe, it is important that the resonant frequency is well below the so-called cut-off frequency of the pipe, which is the lowest frequency at which electromagnetic waves can propagate in a cylindrical waveguide of the size of the pipe. Therefore there is a clear limit on how far towards the free open end of the cone the supports can extend.

The electromagnetic resonance frequency is in the microwave rang as it here is meant to be understood in a broad sense not just covering the strict definition of the range.

Figure 2:
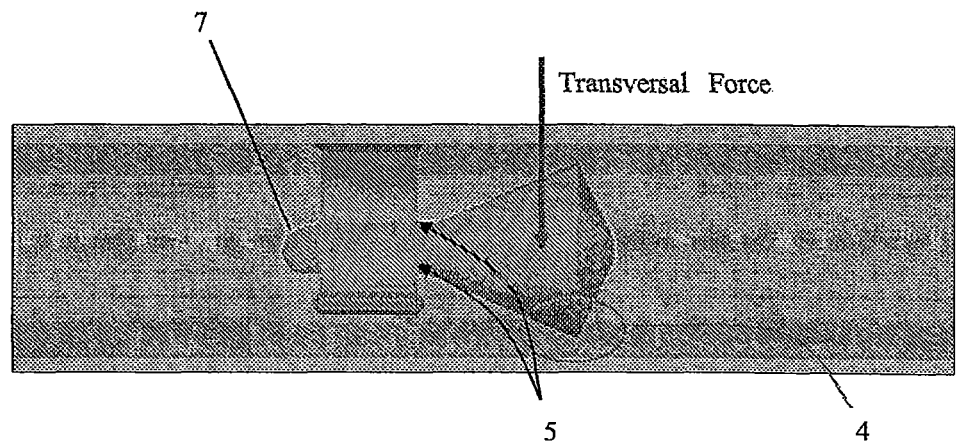
FIG. 2 illustrates a conical insert according to the known art from a side view.

In order not to interfere with the microwave resonator function that is achieved around the intersection 4 of the two conical areas, the support fins 3 are located upstream of that area as seen in FIG. 2.

A weakness of this design is that the weld between the fins 3 and the cone 1 is located in an area of high stress due to abrupt geometry changes. The weld will inevitably in practically all cases contain flaws which act as fatigue initiation sites. Further there are sharp discontinuities at the weld toes 5, 6 that act as stress concentrators. The cone 1 also constitutes relatively large mass being suspended with a relatively large arm from the support. This creates a high bending moment, which contributes to the stress concentration, especially at the downstream weld toe 5. Finally large residual tensile stresses can be present in the weld region and increase the mean stress on the weld.

If the cone/measuring device experiences transversal cyclic loading, such as vibrations, for example created by the flow passing through the meter body 2, exciting the unsupported mass of the cone 1, relatively high stresses will appear in the weld toe 5 as seen in FIG. 2. If the load is repeated for a large amount of cycles it can cause crack initiation and growth in the weld toe 5, finally resulting in detachment of the cone 1 from the support fins 3, and hence collapse of the cone 1. The cone 1 will, if completely detached from the support, be carried by the flow and may damage not only the sensors and the meter body 2, but also equipment downstream of the meter body 2.

As a means to improve the mechanical properties, and especially the fatigue properties of the cone 1 and its support 3, and to assure the structural integrity of the same, and at the same time maintain the properties of the microwave resonator acceptable, the following preferred modifications were made:

The cone 1 is fabricated as one piece with one or more support fins 3 integrated in the upstream part of the cone 1. This will eliminate welds in the high stress area of the weld toe 5. Manufacturing methods may include machining, casting, forging and hot isostatic pressing (HIP).

A stress relief radius in the transition area adjacent the weld toe 5 between fin 3 and the cone 1 to minimize stress concentrations.

The fins 3 can be welded to the meter body 2.

The cone 1, fins 3 and meter body 2 can be manufactured as one piece.

By one of more of these modifications the fatigue life of the cone/measuring device is vastly improved. The details of these modifications will be explained in more detail below.

Figure 3:
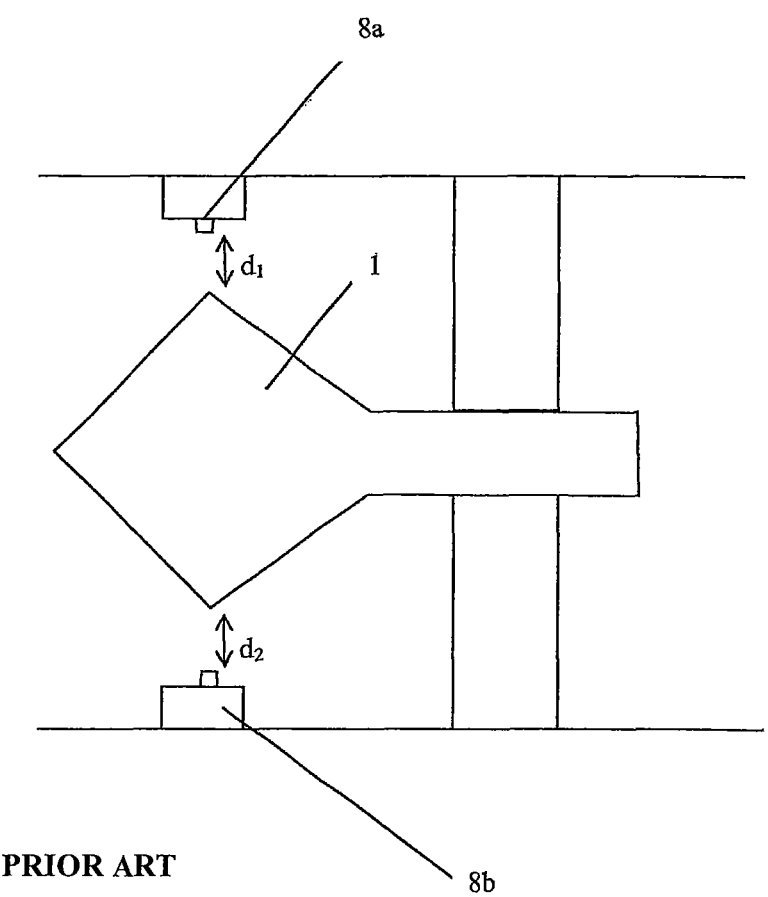
FIG. 3 illustrates a conical insert with electromagnetic transmitter and receiver constituting a resonator cell.

FIG. 3 illustrated the resonator related to the abovementioned U.S. Pat. No. 6,915,707. The resonance measurement is performed by applying an electromagnetic field through a first antenna probe 8a (Tx) into the cavity constituted in the gap between the insert and the pipe wall. The applied field has a varying frequency, e.g. in frequency sweep, and the signal is received with another probe 8b (Rx), and the resonant frequency and/or Q-factor are determined from the shape of the transmission function (i.e. the insertion loss as a function of frequency). The resonance appears as a peak at the resonant frequency in the response, and the Q-factor affects the width of the peak. More precisely, the Q-factor equals the ratio between the resonant frequency, and the peak width, so-called 3 dB-width, measured at half of the peak power. The resonant frequency and Q-factor characterize the permittivity of the flowing fluid in the pipe which in turn will provide a measure of a number of characteristics of the fluid.

As is illustrated in FIG. 3 the distances d1 and d2 between probes 8a and 8b and the insert will vary when the insert vibrates. This affects mainly the coupling properties of the probes and thereby the height of the resonance peak in the frequency response. The movement of the insert relative to the pipe wall affects the resonant frequency. The changes in resonance may be detected as well as the amplitude. The figure illustrates a situation with one transmitter and one receiver, but more than one may be used for obtaining a more accurate indication of the insert movements and direction of movements.

Figure 4:
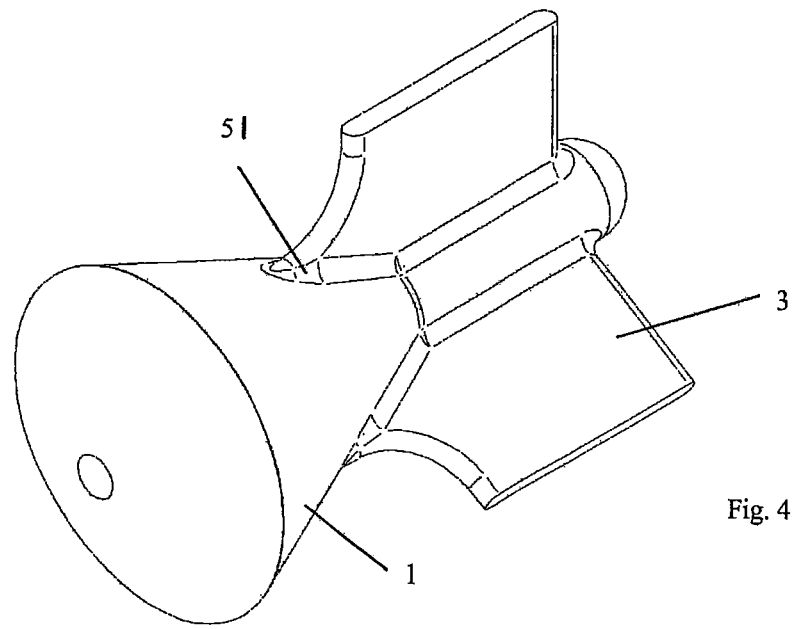
FIG. 4 illustrates a conical insert according to the invention.
Figure 5:
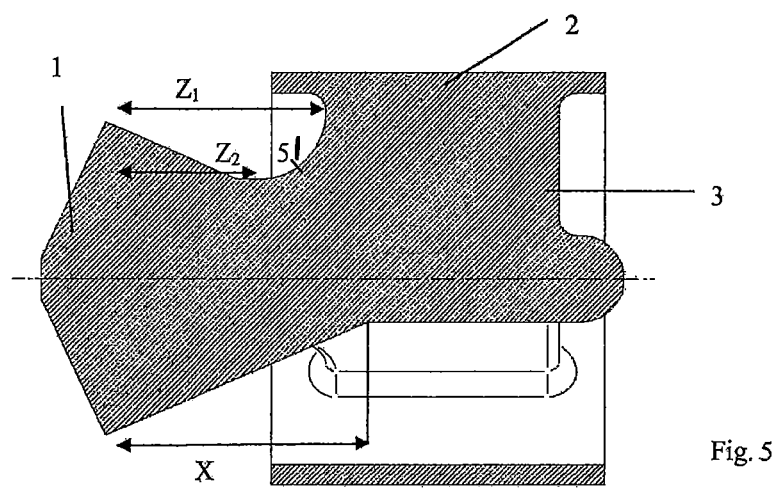
FIG. 5 illustrates a longitudinal section of the conical insert according to the invention.

The new structure according to the invention is shown in FIGS. 4 and 5. The shape of the supporting fins has been changed to have a smooth curving profile at the end facing the cone. The mechanical benefits are that the stress levels in the transition from cone to support are much lower, and the maximum stress is no longer located in an area of a weld, but in the solid steel. The steel has a much higher fatigue limit than the weld, and consequently the fatigue life of the insert and its support is substantially increased. The benefit for the microwave properties is that the increase in frequency is small due to the fact that the point, where the fins are shorted to the pipe wall, has been moved in the direction of the cone by only a small amount, or might even be unchanged. The new design therefore gives better mechanical properties without affecting the microwave properties substantially.

FIG. 4 shows an isometric view of an improved insert 1 with support fins 3. FIG. 5 shows a longitudinal section of an improved insert 1 with fins 3 integrated with a meter body 2.

The conical insert (cone) 1 and the support fins 3 are preferably made as in one integral part. Optionally, as shown in FIG. 5, the sleeve shaped meter body 2 may also be an integral part of the cone and support fins. However, the stresses at the interface between the fins 3 and the meter body 2 are substantially lower than at the interface between the cone 1 and the fins 3, since most of the bending moment will be taken up in the area 5 where the fins 3 raises from the cone 1 surface.

As mentioned above in relation to FIG. 3 the vibrations in the insert will affect the resonance conditions in the cavity between the pipe wall and the insert. For monitoring the vibrations and this stress on the insert, microwave probes 8 may be provided close to the insert, illustrated as a double cone 1 in FIG. 3, and as described in above mentioned U.S.

Pat. No. 6,915,707. The system is adapted to measure the electromagnetic resonance frequency. Thus the system is able to sense changes in the cavity as the cone 1 moves if the sampling frequency is sufficiently large.

Figure 6:
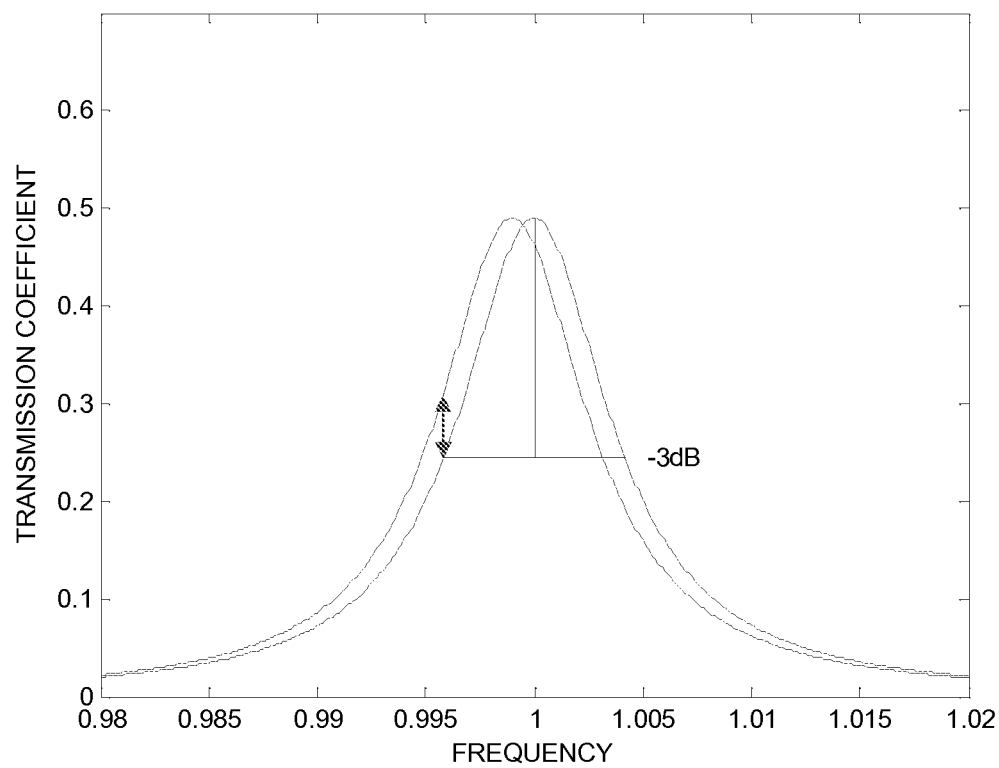
FIG. 6 illustrates the effect of the insert movement on the resonance frequency.

As the cone 1 vibrates the resonance frequency measured at the receiver 8b will vary a little depending on how far the cone 1 moves from the centre line. If the amplitude is measured at the frequency where the electromagnetic resonance (EM resonance) curve is the steepest, which will be in the so-called 3 dB-points, we will see that the effect varies along with the vibrations. This is illustrated in FIG. 6. This measurement is repeated at a high rate within a period so as to obtain a time series of measurements. The resolution in the time scale should be twice the highest interesting frequency to, in practice 4 times the vibration frequency to meet the Nyquist criterion. Performing a Fast Fourier Transform analysis of the time series will provide a curve with a peak with a height being proportional to the vibration amplitude. As one may assume that the frequency is shifted in the same direction regardless of the direction in which the cone 1 is moved the peak should appear at twice the vibration frequency.

Figure 7:
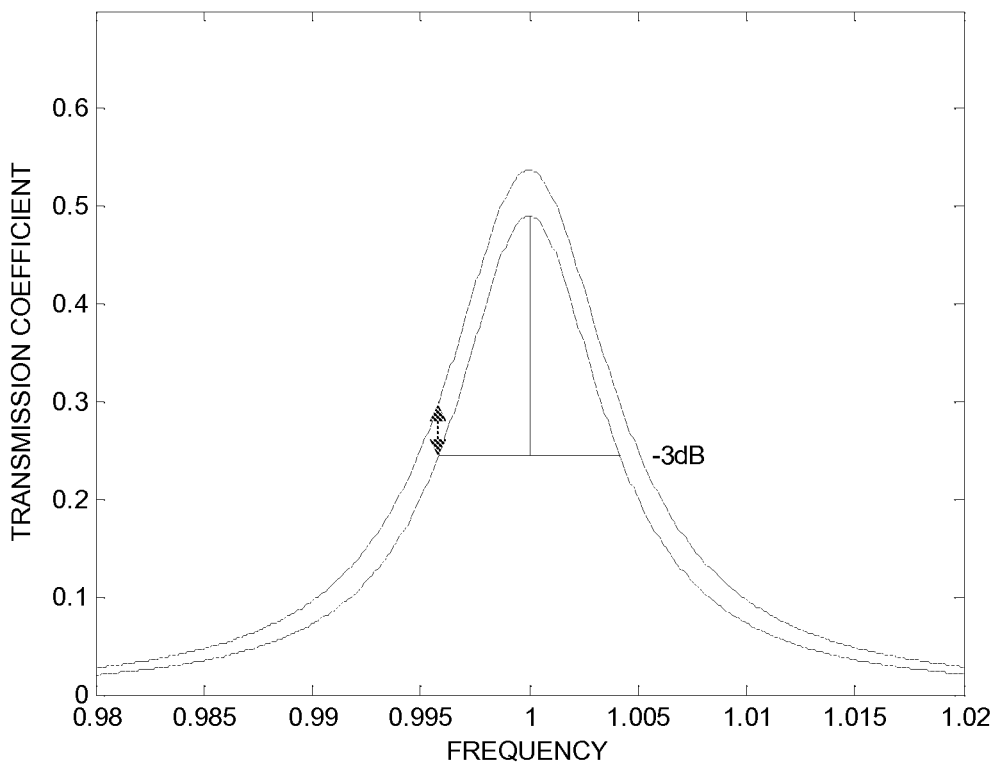
FIG. 7 illustrates the effect of the insert movement on the amplitude at the resonance frequency.

As the cone 1 moves it will also change the distance to the probes 8, and because of the capacitive coupling between the probes 8 and the cone 1 the coupling factor and thus the peak height will also be affected, and if performing the measurements at the rate described above, the power level of the transmission coefficient will go up and down, as illustrated in FIG. 7. Contrary to the effect described above, these variations in the peak height will be at the vibration frequency of the cone 1.

In practise both the two described effects will be present in the measurements and may be analysed to find the vibration amplitude and frequency of the cone 1. In addition harmonic frequencies will also appear. All of these effects may also be used in the analysis, and especially the combination of the measurements described in relation to FIGS. 6 and 7 comparing both peak values, frequency and corresponding values at the 3 dB points.

By performing bench tests of a cone and support, the expected lifetime of a specific cone 1 and its support can be determined as a function of number of vibrations and amplitude of the vibrations. By the above method the number of vibrations and average amplitude over time can be calculated and compared to the total number of vibrations and their amplitude that the cone may endure before a fatigue results in detachment of the support. Thereby, the above method can be used to determine the fatigue of the cone support and its remaining expected life time.

In the bench tests the exact measured values corresponding to the movements and the limits for the allowed vibrations may be chosen through calibration while comparing the oscillations from the FFT (Fast Fourier Transform) spectre with measurements provided by accelerometers etc. . . . measuring the movements of the insert. The system thus stores a number of predetermined calibration values and the measurements provided by the resonator system is compared with the calibration values for determining the movements of the insert.

The method can also be used to determine if the cone is exposed to vibrations close to its mechanical resonance frequency. If the cone is exposed to such vibrations, the flow through the meter body 2 can be changed in an attempt to avoid imposing vibrations close to the mechanical resonance frequency of the cone. Thereby, the service life can be greatly extended.

The method for monitoring the fatigue of the insert is efficient for avoiding unexpected breakdown of existing cones as well as cones with an improved fatigue resistance.

As mentioned above the vibrations in the insert will affect both the resonant frequency of the cavity and the coupling of the probes. The changes are so small that they will not affect the normal permittivity measurements. They are also so fast that they will not be resolved in the measurements of the resonant frequency. The mechanical vibrations will be in the range of hundreds of cycles per second, while the flow meter measures the resonant frequency to retrieve the permittivity at the maximum tens of times per second.

A preferable application of the invention would be to include measurements of vibration in the standard measurement routines of a meter. With specified intervals the meter would pause the measurements of permittivity and turn into the modus of vibration measurement for a short moment. The meter would automatically analyze the results and give a warning if needed. The results would also be stored for subsequent manual analysis.

Thus the measured data may be used and interpreted in various ways. If a peak is detected in a calculated FFT spectrogram of a measured time series, this will indicate that there is a vibration at that frequency. Based on this an operator or control system may change the fluid flow velocity to reduce the vibrations.

By comparing the FFT spectrogram, either visually or in an algorithm, with destructive bench tests the amplitude of the vibrations may be estimated as well as the life time of the cone under the prevailing conditions. Thus time to service may also be estimated.

If the peak in the FFT spectrogram has been increasing in height over time or drifting toward lower frequencies, while the flow conditions have been unchanged this may be interpreted as a change in the mechanical strength of the cone, e.g. as a change in stiffness or the mechanical resonance frequency of the cone. This may be interpreted as a warning that fatigue cracks may have been initiated and that actions should be taken to reduce the vibrations and to avoid cone failure which otherwise may be imminent.

There are two main requirements for the measurement of vibration with the microwave system: Speed and sensitivity. Both can be achieved with the method described above. However, any method that fulfils the requirements is considered to be within the frame of the invention. Such an alternative method may e.g. be to lock an oscillator, e.g. an amplifier with positive feedback through the sensor, to the resonance peak.

As stated above it is an object of this invention to reduce the risk level for vibration induced fatigue failures in insert structures without reducing the quality of microwave resonant frequency measurements. One aspects of this is the improved mechanical design. This is obtained by letting the supporting structure 3 extend a chosen length along the conically shaped portion thus providing a transition zone 51 being less susceptible for stress induced failure of the structure. The support and transition zone should extend as far as possible along the conical portion but limited by the required quality of the measurements.

Figure 8A:
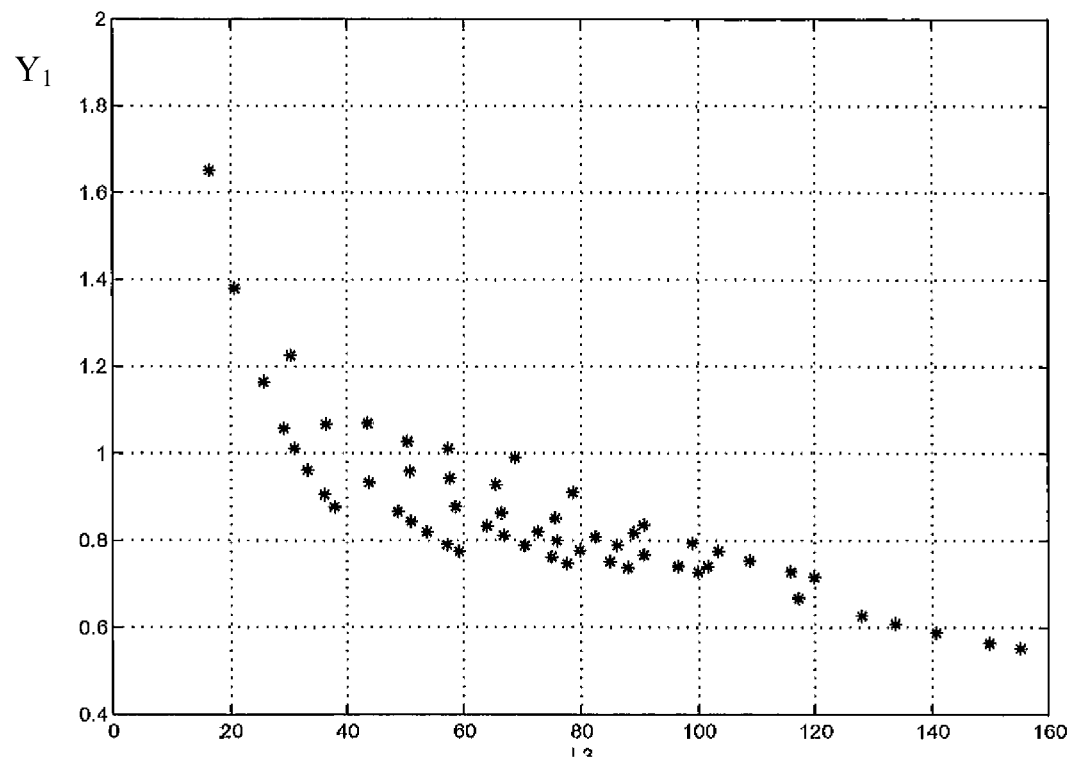
Figure 8B:
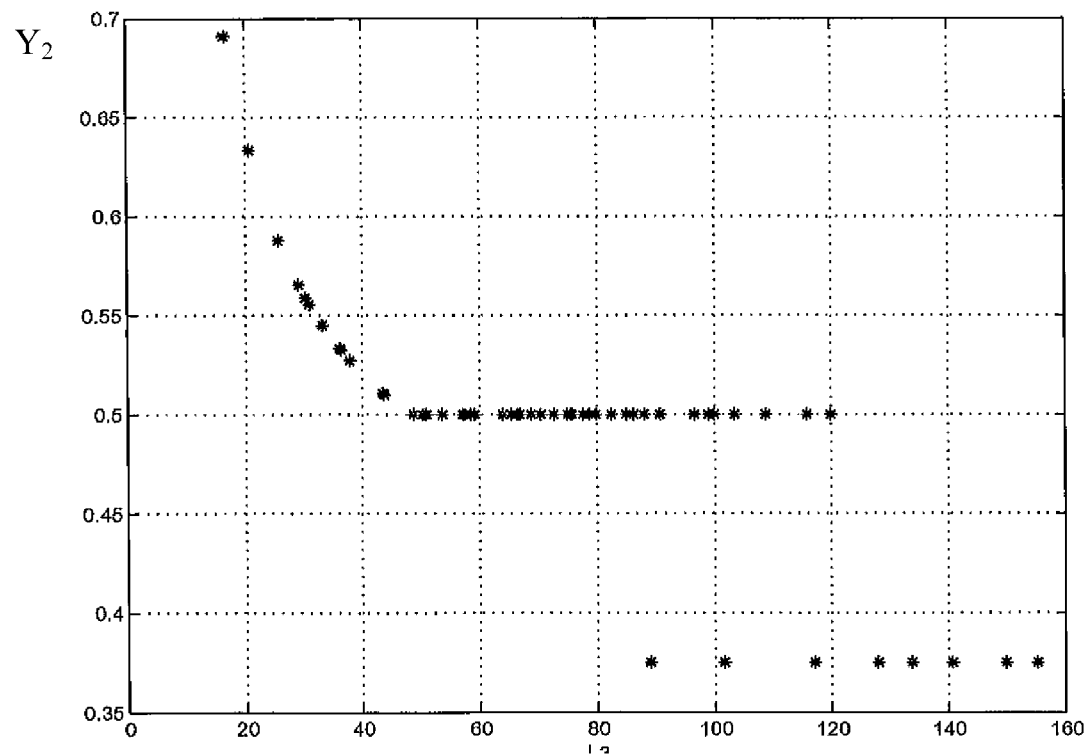

Returning to FIG. 5 the conical portion has a length X from the supporting structure to the widest area being coupled to the probes. While the support should extend a length $X-Z_1$ into the conical part sufficient to increase the strength of the structure the support should not affect the microwave measurements. On order to reduce the effect on the microwave measurements the transition zone 51 may be chosen to extend a larger length $X-Z_2$ into the conical portion. The exact values of $Z_1$ and $Z_2$ will depend on a number of things, and the ratios $Y_1=Z_1/X$ and $Y_2=Z_2/X$ are indicated in FIGS. 8a and 8b, where the length of the conical portion is along the X-axis. The plots in FIGS. 8a and 8b are calculated under the requirement that a uniform electromagnetic field is to be obtained along the circumference of the insert, e.g. for measuring in pipes having a non-uniform flow over the pipe cross section. Thus the figures illustrate the optimal compromise between increasing the strength of the support and reducing the influence of the support on the electromagnetic field.

As is evident from FIGS. 8a and 8b the minimum ratio $Y_1$ is 0.55, corresponding to almost half the conical portion, and the minimum ratio $Y_2$ is 0.375, corresponding to almost ⅔ of the conical portion, respectively. These numbers are suitable for larger cones, but ratios for $Y_1$ is usually between 0.7 and 1.0 for smaller cones (less than ⅓ of the conical portion), and for $Y_2$ the ratio is usually 0.5 or more (less than half the conical portion).

Thus in practice, depending on the required measuring accuracy and strength of the support, the ratio $Y_1$ should be more than 0.4, preferably more than 0.5 and usually more than 0.7, while the ratio $Y_2$ should be more than 0.3, preferably more than 0.375 and usually between than 0.5 and 0.7 in order to obtain sufficient measuring quality for the probes and improved mechanical strength.

The invention claimed is:

1. A method for monitoring a body inserted in a conduit, the method comprising:
    positioning the body a distance from a wall of the conduit thereby providing a gap between the body and the wall of the conduit, the gap constituting an electromagnetic resonator, at least one coupling probe being positioned close to said gap;
    applying an electromagnetic signal at a frequency higher than that required for meter measurements;
    monitoring a frequency response of a resonator through the coupling probe; and
    analyzing the frequency response to provide a measure of movements of the body induced by a turbulent flow.

2. The method according to claim 1, wherein the resonance is detected by applying frequency sweep with a range from a transmitter and detecting a amplitude at a receiver, and analyzing a received signal for detecting the variations in resonance frequency.

3. The method according to claim 2, wherein amplitude variations at a resonance frequency peak are measured to indicate the movements of the body.

4. The method according to claim 3, wherein the amplitude at a 3 dB point of the resonance frequency is monitored.

5. The method according to claim 3, wherein a position of the resonance peak is monitored.

6. The method according to claim 3, wherein a signal at a frequency on a flank of the resonance peak, preferably close to a 3 dB point, is applied and the response is monitored to indicate movements of the insert.

7. An insert for electromagnetic resonance measurements comprising:
    an essentially conically or biconically shaped portion cantilevered from a support structure;
    a support structure that supports the essentially conically or biconically shaped portion, the support structure including at least one fin extending from the insert to a conduit wall or meter body; and
    wherein the at least one fin extends partly into the essentially conically or biconically shaped portion but only to an extent that does not influence substantially on an electromagnetic resonance measurement.

8. The insert according to claim 7, wherein the at least one fin is formed in one piece with the insert.

9. A system including an insert according to claim 7, wherein the insert is positioned in an axial position in a conduit conducting a fluid flow, providing a cavity between the insert and a conduit wall constituting an electromagnetic resonator cell, and wherein at least one coupling probe is positioned in the conduit wall at a longitudinal position, preferably where the insert has a maximum diameter, the system comprising:
    means for applying a varying electromagnetic signal into the resonator cell and detecting a resonance frequency of the resonator cell and detecting movements in the insert based on an analysis of measured electromagnetic signals.

10. The system according to claim 9, wherein information is stored based on bench tests of similar equipment and an expected life time of the insert is predicted based on the detected movement and said tests.

11. The system according to claim 9, wherein a flow rate through said conduit is controlled and the flow rate is adjusted when the movements of said insert exceed a chosen value.

12. An insert for electromagnetic resonance measurements comprising:
    an essentially conically or biconically shaped portion;
    a support structure including at least one fin extending from the insert to a conduit wall or meter body;
    wherein the at least one fin extends partly into the essentially conically or biconically shaped portion but only to an extent that does not influence substantially on an electromagnetic resonance measurement; and
    wherein the at least one fin includes a rounded transition zone extending less than 80% of a conical portion length and a support section extending less than 50% into the conical portion.

13. An insert for electromagnetic resonance measurements comprising:
    an essentially conically or biconically shaped portion;
    a support structure including at least one fin extending from the insert to a conduit wall or meter body; and
    wherein the at least one fin extends partly into the essentially conically or biconically shaped portion but only to an extent that does not influence substantially on an electromagnetic resonance measurement.

* * * * *